US011303949B2

(12) United States Patent
Wu et al.

(10) Patent No.: US 11,303,949 B2
(45) Date of Patent: Apr. 12, 2022

(54) METHOD OF SWITCHING RESOLUTION, COMPUTING DEVICE, AND COMPUTER-READABLE STORAGE MEDIUM

(71) Applicant: Shanghai Bilibili Technology Co., Ltd., Shanghai (CN)

(72) Inventors: Zhiqiang Wu, Shanghai (CN); Hanchao Zheng, Shanghai (CN); Hui Chen, Shanghai (CN); Jianqiang Ding, Shanghai (CN); Zhaoxin Tan, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 0 days.

(21) Appl. No.: 17/342,293

(22) Filed: Jun. 8, 2021

(65) Prior Publication Data
US 2021/0329319 A1 Oct. 21, 2021

Related U.S. Application Data

(63) Continuation of application No. PCT/CN2019/128448, filed on Dec. 25, 2019.

(30) Foreign Application Priority Data

Jan. 30, 2019 (CN) .......................... 201910091813.9

(51) Int. Cl.
*H04N 21/2662* (2011.01)
*H04L 65/60* (2022.01)
(Continued)

(52) U.S. Cl.
CPC ....... *H04N 21/2662* (2013.01); *H04L 65/601* (2013.01); *H04N 21/23439* (2013.01); *H04N 21/234363* (2013.01); *H04N 21/2402* (2013.01)

(58) Field of Classification Search
None
See application file for complete search history.

(56) References Cited

U.S. PATENT DOCUMENTS

2007/0044123 A1   2/2007  Zriny et al.
2012/0059951 A1*  3/2012  Gutarin ............... H04L 47/2416
                                                         709/233
(Continued)

FOREIGN PATENT DOCUMENTS

CN    103702219 A    4/2014
CN    106375836 A    2/2017
(Continued)

OTHER PUBLICATIONS

European Search Report in EP19912438.9, dated Oct. 19, 2021, 7 pages.
(Continued)

*Primary Examiner* — James A Edwards
(74) *Attorney, Agent, or Firm* — McAndrews, Held & Malloy, Ltd.

(57) ABSTRACT

A method of switching resolution is provided. The method includes: in playing audio and/or video using DASH, acquiring a media presentation description (MPD) file and obtaining resolution information through parsing the MPD file; during the playing of the audio and/or video, periodically determining a currently secure downloading speed according to a preset time interval and determining whether a resolution switching for the audio and/or video currently being played is required according to the secure downloading speed and the resolution information; and in accordance with a determination that the resolution switching is required, determining a switching time point according to an elapsed duration of a currently playing segment and a preset
(Continued)

secure buffering duration and performing resolution switching at the switching time point.

15 Claims, 3 Drawing Sheets

(51) Int. Cl.
*H04N 21/2343* (2011.01)
*H04N 21/24* (2011.01)

(56) References Cited

U.S. PATENT DOCUMENTS

| | | | |
|---|---|---|---|
| 2014/0019635 | A1 | 1/2014 | Reznik et al. |
| 2016/0366454 | A1* | 12/2016 | Tatourian ............ H04N 21/2393 |
| 2016/0381112 | A1* | 12/2016 | Ramamurthy .......... H04L 65/60 709/219 |
| 2018/0191801 | A1 | 7/2018 | Chen et al. |
| 2019/0230010 | A1* | 7/2019 | Guo ........................ H04L 43/04 |

FOREIGN PATENT DOCUMENTS

| | | |
|---|---|---|
| CN | 106993237 A | 7/2017 |
| CN | 107197371 A | 9/2017 |
| CN | 108271048 A | 7/2018 |
| CN | 108574860 A | 9/2018 |
| CN | 109040855 A | 12/2018 |
| EP | 2 481 197 A2 | 8/2012 |

OTHER PUBLICATIONS

Information technology—MPEG systems technologies—Part 6: Dynamic adaptive streaming over HTTP (DASH), 3GPP2 Draft; 29N11873T, 3rd Generation Partnership Project 2, 3GPP2, 2500 Wilson Boulevard, Suite 300, Arlington, Virginia 22201 ; USA vol. TSGC Mar. 27, 2011 (Mar. 27, 2011), pp. 1-86, XP062177031, Retrieved from the Internet: URL:http://ftp.3gpp2.org/TSGC/Working/2011/2011-03-Seoul/TSGC-2011-03-Seoul/WG1/11 - 03 - 02 - Teleconference/ [retrieved on Mar. 27, 2011].

Vu Van-Huy et al: "Bandwidth Estimation Based on MACD for DASH", 2016 10th International Conference on Innovative Mobile and Internet Services in Ubiquitous Computing (IMIS), IEEE, Jul. 6, 2016 (Jul. 6, 2016), pp. 176-181, XP033034481, 001: 10.11 09/IMIS.2016.54 [retrieved on Dec. 21, 2016].

Fang, Hongjun, "Video Post Processing Technologies Research of Smart TV for Supporting Resolution Dynamic Change," A Dissertation Submitted to Shanghai Jiao Tong University for Master Degree of Engineering, School of Electronics and Electric Engineering, Shanghai Jiao Tong University, Shanghai, P.R. China, Jun. 2015.

International Search Report dated Mar. 16, 2020, in International application No. PCT/CN2019/128448, filed on Dec. 25, 2019.

* cited by examiner

METHOD OF SWITCHING RESOLUTION, COMPUTING DEVICE, AND COMPUTER-READABLE STORAGE MEDIUM

CROSS REFERENCE TO RELATED APPLICATION

The present application is a continuation under 35 U.S.C. 111(a) of PCT International Application No. PCT/CN2019/128448, filed on Dec. 25, 2019, which claims priority to Chinese patent application No. 201910091813.9, filed on Jan. 30, 2019, the entire contents of which are hereby incorporated by reference in their entirety for all purposes.

TECHNICAL FIELD

The present application relates to audio and video playing, and particularly to a method of switching resolution, a computing device, and a computer-readable storage medium.

BACKGROUND

To make audio and video play more smoothly, more and more video websites have begun to use Dynamic Adaptive Streaming over HTTP (DASH) technology, which is an adaptive bitrate streaming technology and enables high-quality streaming media to be delivered over the Internet through a traditional HTTP web server; DASH splits a streaming media content into multiple segments, each segment contains a certain length (e.g., 10 seconds) of playable content, and each segment is corresponding to multiple resolutions (e.g., 1080P, 720P, 480P, 360P), and a client can choose to download and play the segments with a specified resolution according to current network conditions. Compared with traditional audio and video playing technologies, it is not required to reload a player when switching a resolution.

SUMMARY

One aspect of the present application provides a method, including:

in playing audio and/or video using Dynamic Adaptive Streaming over HTTP (DASH), acquiring a Media Presentation Description (MPD) file and obtaining resolution information through parsing the MPD file;

during the playing of the audio and/or video, periodically determining a currently secure downloading speed according to a preset time interval and determining whether a resolution switching for the audio and/or video currently being played is required according to the secure downloading speed and the resolution information; and in accordance with a determination that the resolution switching is required, determining a switching time point according to an elapsed duration of a currently playing segment and a preset secure buffering duration and performing resolution switching at the switching time point.

Another aspect of the present application provides a computing device, including: one or more processors; and one or more non-transitory computer-readable storage mediums containing instructions configured to cause the one or more processors to perform operations including:

in playing audio and/or video using Dynamic Adaptive Streaming over HTTP (DASH), acquiring a Media Presentation Description (MPD) file and obtaining resolution information through parsing the MPD file;

during the playing of the audio and/or video, periodically determining a currently secure downloading speed according to a preset time interval and determining whether a resolution switching for the audio and/or video currently being played is required according to the secure downloading speed and the resolution information; and in accordance with a determination that the resolution switching is required, determining a switching time point according to an elapsed duration of a currently playing segment and a preset secure buffering duration and performing resolution switching at the switching time point.

Another aspect of the present application provides a non-transitory computer-program product tangibly embodied in a machine-readable non-transitory storage medium that includes instructions configured to cause one or more processors to:

in playing audio and/or video using Dynamic Adaptive Streaming over HTTP (DASH), acquire a Media Presentation Description (MPD) file and obtain resolution information through parsing the MPD file;

during the playing of the audio and/or video, periodically determine a currently secure downloading speed according to a preset time interval and determine whether a resolution switching for the audio and/or video currently being played is required according to the secure downloading speed and the resolution information; and in accordance with a determination that the resolution switching is required, determine a switching time point according to an elapsed duration of a currently playing segment and a preset secure buffering duration and perform resolution switching at the switching time point.

BRIEF DESCRIPTION OF THE DRAWINGS

Upon reading the detailed description of some embodiments below, various other advantages and benefits will become apparent to those of ordinary skill in the art. The drawings are only for the purpose of illustrating some embodiments and are not to be considered as limiting the present application. Moreover, the same reference numerals are used throughout the drawings to refer to the same parts. In the drawings.

DETAILED DESCRIPTION

To make the embodiments and advantages of the present application more comprehensible, the present application is described in further detail below with reference to embodiments and the accompanying drawings. It should be understood that the specific embodiments described herein are merely used for explaining the present application, and are not intended to limit the present application. All other embodiments obtained by those skilled in the art based on the embodiments of the present application without creative efforts shall fall within the protection scope of the present application.

Inventors found that when using DASH, it is not intelligent enough to switch the resolution according to a selection of a user; in addition, since the segments are required to be downloaded and buffered, in a process of resolution switching, there will be situations where a currently playing segment has been played completely but a next segment has not been downloaded yet, causing a playing freeze and affecting user's experience.

According to some embodiments, the method of switching resolution provided by the present application is described below with reference to the accompanying drawings.

Figure 1:
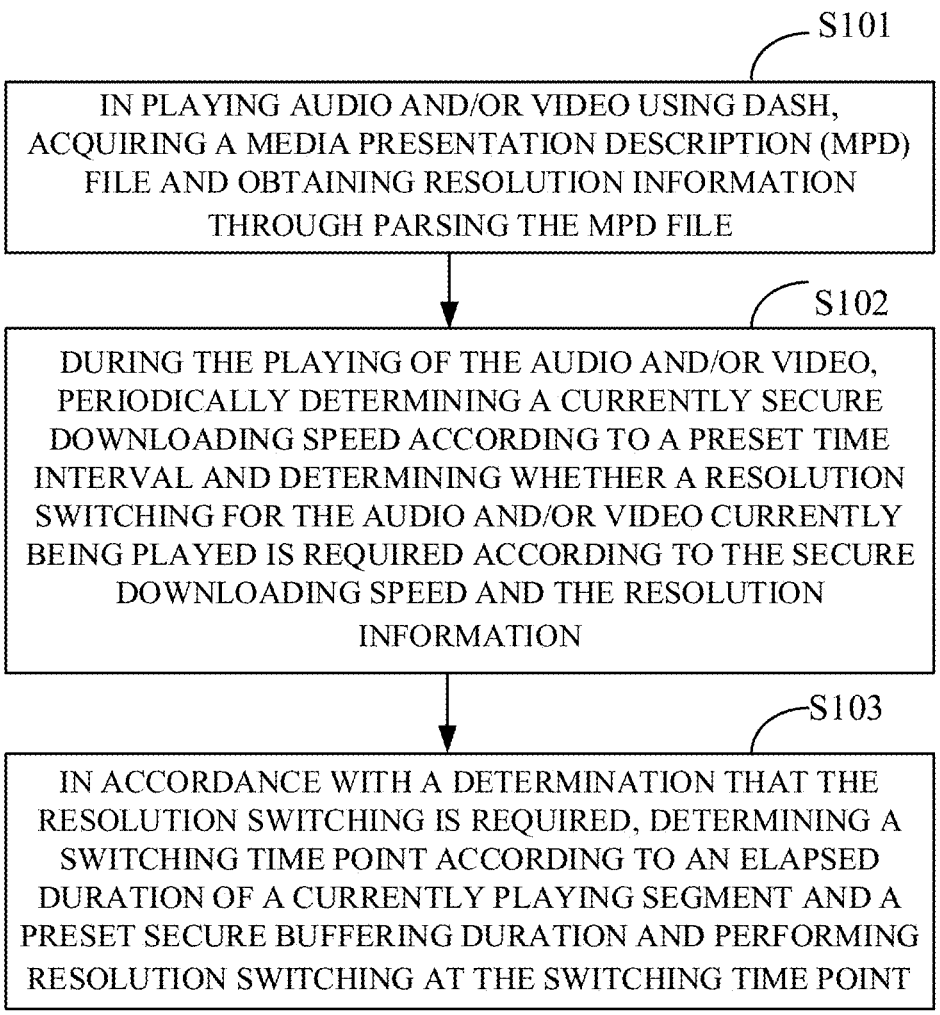
FIG. 1 illustrates a flowchart of a method of switching resolution according to some embodiments.

FIG. 1 illustrates a flowchart of a method of switching resolution according to some embodiments, and the method is applied to a DASH client. As shown in FIG. 1, the method may include the following steps:

Step S101, in playing audio and/or video using DASH, acquiring an MPD file and obtaining resolution information through parsing the MPD file.

Specifically, the resolution information includes multiple usable resolutions and bandwidths corresponding to respective ones of the multiple resolutions.

Further, the MPD file is a media presentation description file of the audio and/or video, which can be used to describe composition of the entire MPEG DASH (also known as DASH) code streaming, being equivalent to M3U8 (M3U8 is a kind of video format) file in the HTTP Live Streaming (HLS) protocol, the MPD file is an XML (Extensible Markup Language) Document (Document is a computer term, and each Hyper Text Markup Language (HTML) document loaded into a browser is a Document object), content of the MPD file can be used to construct URLs (Uniform Resource Locator) of HTTP GET requests (HTTP GET request is a way of HTTP request) for downloading.

Figure 2:
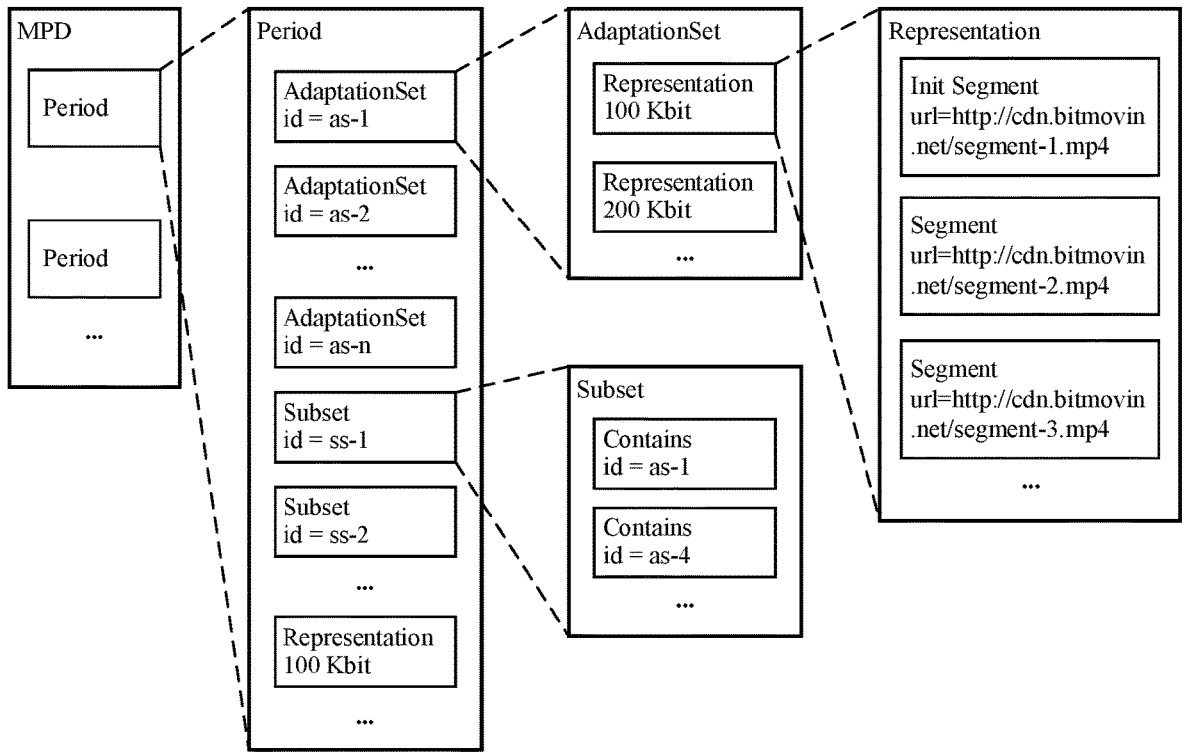
FIG. 2 illustrates a schematic diagram of a content structure of an MPD file according to some embodiments.

As shown in FIG. 2, illustrating a schematic diagram of content structure of the MPD file in XML format, the MPD file in XML format includes multiple segment Period files; each of the Period files has a corresponding AdaptationSet file for application description; one AdaptationSet file contains Representation files for resolution descriptions of different resolutions or streams, each of the Representation files is corresponding to a resolution, and each of the Representation files contains a bandwidth requirement for the corresponding resolution; one Representation file contains a plurality of segments, and each segment is corresponding to a video content or audio content for a certain time length.

In the MPD file in XML format, streaming media content is placed into a Period segment; video data and audio data in the streaming media content are separately stored into different AdaptationSet segments; videos or audios of different resolutions are represented by different Representation segments; and video attribute information or audio attribute information is included in one Representation segment.

Further, the obtaining resolution information through parsing the MPD file includes:

obtaining usable resolutions and bandwidths corresponding to respective ones of the resolutions though parsing the Representation file in the MPD file.

According to some embodiments, in practical applications, a resolution list can be obtained by parsing the MPD file, and the resolution list includes index values, information of resolutions, information of bandwidths corresponding to the resolutions, and information of URLs (Uniform Resource Locator) of the audio or video.

Step S102, during the playing of the audio and/or video, periodically determining a currently secure downloading speed according to a preset time interval and determining whether a resolution switching for the audio and/or video currently being played is required according to the secure downloading speed and the resolution information.

Specifically, the periodically determining the currently secure downloading speed according to a preset time interval includes:

step A1, obtaining playing information of N segments before the currently playing segment; where N is a positive integer;

further, the playing information includes: a connection establishment duration, a downloading duration, and a total downloading byte count;

the connection establishment duration is duration from the time when the DASH client sends a request to the HTTP server to the time when the DASH client receives the response returned by the HTTP server;

the downloading duration is duration from the time when the DASH client starts downloading audio and/or video based on the received response to the time when the downloading is ended; and the total downloading byte count is total number of bytes consumed for downloading the audio and/or video.

In some embodiments, whenever a segment is downloaded, the DASH client will obtain the total downloading byte count from file header of a segment file, count the connection establishment duration and the downloading duration of the segment, and store total downloading byte count, the connection establishment duration, and the downloading duration of the segment for later use in calculating the secure downloading speed.

Step A2, calculating an actual downloading speed of each segment based on the playing information of each segment, and calculating an average downloading speed according to actual downloading speeds of the N segments;

further, the calculating an actual downloading speed of each segment based on the playing information of each segment includes: the actual downloading speed=(8×the total downloading byte count)/(the connection establishment duration+the downloading duration).

The calculating an average downloading speed according to actual downloading speeds of the N segments includes:

the average downloading speed=(a first actual downloading speed+a second actual downloading speed+ . . . +an $N$-th actual downloading speed)/$N$.

Step A3, multiplying the average downloading speed by a preset secure factor and a percentage to obtain the currently secure downloading speed.

Further, the percentage K is calculated according to a formula of:

$K=(D-L)/D;$ where D is a playing duration of one segment;

L is an average connection establishment duration calculated according to connection establishment durations of the N segments, and L<D.

The Step A3 includes:

the secure downloading speed=the average downloading speed×$P$×$K$;

where P is the secure factor; according to some embodiments, P is 0.8.

In some embodiments, since a connection establishment time and a network jitter of obtaining segments are taken into account when calculating the secure downloading speed, current network speed can be guaranteed to meet a bandwidth requirement of the resolution after the resolution switching. Specifically, the influence of the average connection establishment duration during downloading the segment is considered when calculating the secure downloading speed; since the duration from sending the segment downloading request by the DASH client to the HTTP server to finishing downloading the segment includes the connection establishment duration and the downloading duration, the total duration of downloading the segment is the sum of the connection establishment duration and the downloading duration; since the total duration of downloading the segment cannot exceed the playing duration of the segment, the maximum downloading duration of the segment is the difference between the playing duration of the segment and the connection establishment duration of the segment; therefore, the percentage K indicates a proportion of the maximum downloading duration of the segment to the playing duration of the segment. In addition, in some embodiments, a network jitter is also taken into account when calculating the secure downloading speed, and the current downloading speed is guaranteed to be sufficient to meet the bandwidth requirements of certain resolutions by the secure factor P.

Further, the determining whether a resolution switching for the audio and/or video currently being played is required according to the secure downloading speed and the resolution information includes:

adjusting resolutions of subsequently playing segments to be just less than a resolution corresponding to the bandwidth of the secure downloading speed.

In practical applications, the calculated secure downloading speed can be compared with the bandwidth requirements of each resolution in the resolution list to determine the maximum resolution that the current secure downloading speed can support. For example, the current secure downloading speed is 120 Mbps, and according to the resolution information, the available resolutions include 1080P, 720P, 480P, 360P; the bandwidth requirement of 1080P is 150 Mbps, the bandwidth requirement of 720P is 100 Mbps, the bandwidth requirement of 480P is 50 Mbps, and the bandwidth requirement of 360P is 25 Mbps; since the current secure downloading speed can meet the bandwidth requirement of 720P, the resolution of the segments being played afterward is adjusted to 720P.

Further, before the step S102, the method further includes:

calculating the average connection establishment duration according to connection establishment durations of the N segments before the currently playing segment;

determining whether the average connection establishment duration is larger than the playing duration of one segment;

if yes, adjusting the resolution of the audio and/or video to be played later to the minimum; and if not, step S102 is executed.

If the average connection establishment duration is larger than the playing duration of one segment, it means that the next segment cannot be fully downloaded before the currently playing segment is played completely, that is, the audio and/or video of the current resolution cannot be played smoothly; in this situation, the DASH client will minimize the resolution of the audio and/or video currently being played.

In some embodiments, whether to perform resolution switching is determined periodically according to a preset time interval (for example, whether to perform resolution switching is determined every 500 seconds); when the determination is performed, the average downloading speed is calculated according to actual downloading speed of the N (for example, N is 10) segments closest to the currently playing segment, and the secure downloading speed is calculated considering the connection establishment duration and the network jitter; and based on the secure downloading speed, the resolution of the audio and/or video played later is adjusted to the resolution that is sufficiently supported by the secure downloading speed.

Step S103: in accordance with a determination that the resolution switching is required, determining a switching time point according to an elapsed duration of a currently playing segment and a preset secure buffering duration and performing resolution switching at the switching time point.

Specifically, step S103 includes:

calculating the switching time point T according to a formula of:

$$T = \text{ceil}\left(\frac{C+Q}{D}\right)$$

where ceil( ) is a round up function;

C is the elapsed duration of the currently playing segment; and

Q is the secure buffering duration, and Q is equal to 1.5 times the playing duration of one segment; and the resolution switching is performed when playing a T-th segment behind the currently playing segment.

For example, when the value of (C+Q)/D is 3.4, the value of T is 4; after the currently playing segment is completely played, and when the fourth segment is played, the resolution switching is performed.

In some embodiments, the method of switching resolution can periodically determine whether a resolution switching is required according to a currently secure downloading speed under a preset time interval, and automatically perform resolution switching at calculated switching time points. Performing resolution switching at the switching time points can avoid the situations where the segment corresponding to current resolution has been finished playing, but the segment corresponding to the resolution after the resolution switching has not been downloaded yet, sufficient downloading time is ensured for the segments after the resolution switching through calculating the switching time point, thereby, seamless switching of audio and/or video is ensured, and a phenomenon of switching freeze will not occur.

Figure 3:
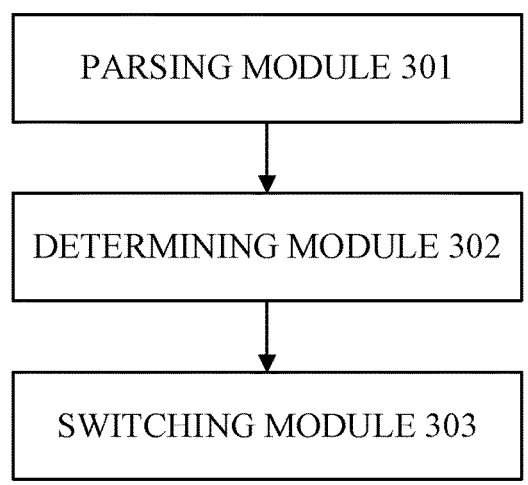
FIG. 3 illustrates a schematic diagram of a program module of a device of switching resolution according to some embodiments.

According to some embodiments, a device of switching resolution is provided, based on the method of switching resolution according to some embodiments. Specifically, FIG. 3 illustrates a schematic diagram of the device of switching resolution, the device of switching resolution is divided into one or more program modules, and the one or more program modules are stored in a storage medium and executed by one or more processors to complete the present application. The program modules referred to in the application refer to a series of computer-readable instruction segments capable of performing specific functions, the following description will specifically introduce the functions of each of the program modules according to some embodiments.

As shown in FIG. 3, the device of switching resolution applied to a DASH client includes:

a parsing module 301 for acquiring a media presentation description (MPD) file and obtaining resolution information through parsing the MPD file, when audio and/or video is played using DASH.

Specifically, the resolution information includes: multiple usable resolutions and bandwidths corresponding to respective ones of the multiple resolutions.

Further, the parsing module 301 specifically for:

obtaining usable resolutions and bandwidths corresponding to respective ones of the resolutions though parsing the Representation file in the MPD file.

As shown in FIG. 3, the device of switching resolution applied to a DASH client includes:

a determining module 302 for, during the playing of the audio and/or video, periodically determining a currently secure downloading speed according to a preset time interval and determining whether a resolution switching for the audio and/or video currently being played is required according to the secure downloading speed and the resolution information.

Specifically, the determining module 302 includes:

an obtaining unit for, obtaining playing information of N segments before the currently playing segment;

a calculating unit for, calculating an actual downloading speed of each segment based on the playing information of each segment, and calculating an average downloading speed according to actual downloading speeds of the N segments;

a processing unit for, multiplying the average downloading speed by a preset secure factor and a percentage to obtain the currently secure downloading speed; and a switching unit for, adjusting resolutions of subsequently playing segments to be just less than a resolution corresponding to the bandwidth of the secure downloading speed.

Further, the playing information includes: a connection establishment duration, a downloading duration, and a total downloading byte count.

The calculating unit is specifically used for:

calculating an actual downloading speed of each segment according to a formula of:

the actual downloading speed=(8×the total downloading byte count)/(the connection establishment duration+the downloading duration);

calculating an average downloading speed of the N segments according to a formula of:

the average downloading speed=(a first actual downloading speed+a second actual downloading speed+ . . . +an N-th actual downloading speed)/N.

Further, the processing unit is used for:

calculating the percentage K according to a formula of:

$$K=(D-L)/D;$$

where D is a playing duration of one segment;

L is an average connection establishment duration calculated according to connection establishment durations of the N segments;

calculating the secure downloading speed according to a formula of:

the secure downloading speed=the average downloading speed×P×K;

where P is the secure factor, according to some embodiments, P is 0.8.

As shown in FIG. 3, the device of switching resolution applied to a DASH client includes:

a switching module 303 for, in accordance with a determination that the resolution switching is required, determining a switching time point according to an elapsed duration of a currently playing segment and a preset secure buffering duration and performing resolution switching at the switching time point.

Specifically, the switching module 303 is used for:

calculating the switching time point T according to a formula of:

$$T = \operatorname{ceil}\left(\frac{C+Q}{D}\right)$$

where ceil( ) is a round up function;

C is the elapsed duration of the currently playing segment; and

Q is the secure buffering duration, and Q is equal to 1.5 times the playing duration of one segment; and the resolution switching is performed when playing a T-th segment behind the currently playing segment.

Figure 4:
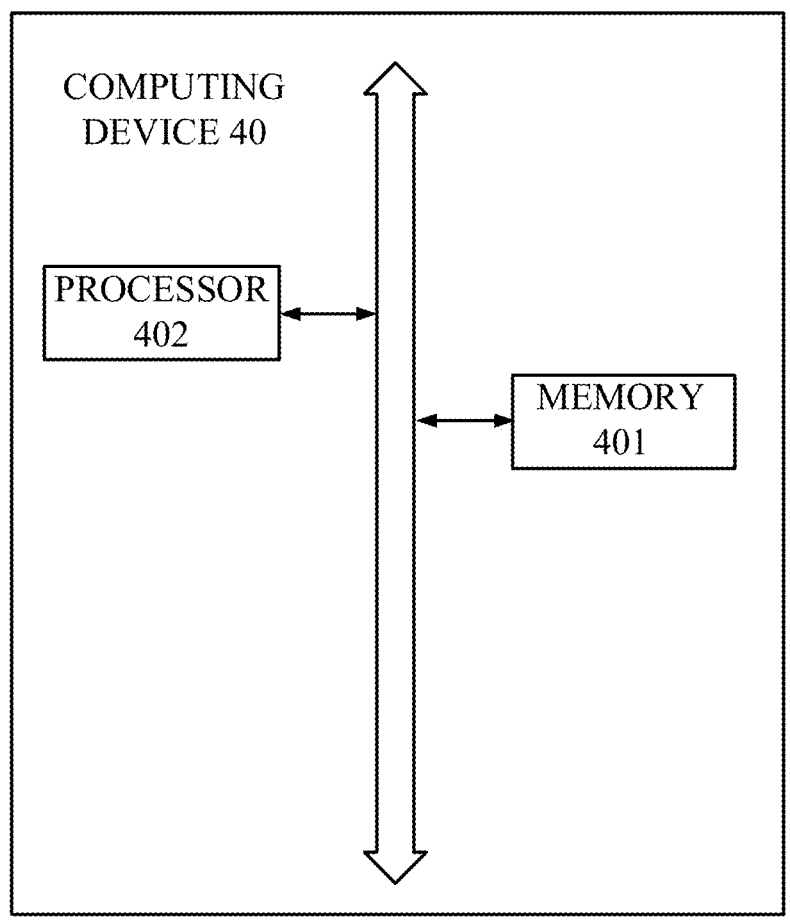
FIG. 4 illustrates a diagram of hardware architecture of a computing device according to some embodiments.

According to some embodiments, a computing device is provided. In some embodiments, the computing device may include but not limited to at least one of: a smartphone, a tablet computer, a notebook computer, a desktop computer, a rack server, a blade server, a tower server, or a rack server (including a stand-alone server, or server cluster consisting of multiple servers), and so on that can execute programs. As shown in FIG. 4, the computing device 40 of the embodiment includes at least, but not limited to: a memory 401 and a processor 402 that can be communicatively connected to each other through a system bus. It should be noted that FIG. 4 only shows the computing device 40 having the components 401-402, but it should be understood that not all components shown are required to be implemented, and more or fewer components may be implemented instead.

In some embodiments, the memory 401 (i.e., readable storage medium) includes a flash memory, a hard disk, a multimedia card, a card-type memory (such as SD or DX memory and so on), a random access memory (RAM), a static random access memory (SRAM), a read-only memory (ROM), an electrically erasable programmable read-only memory (EEPROM), a programmable read-only memory (PROM), magnetic memory, magnetic disks, optical disks and so on. In some embodiments, the memory 401 may be an internal storage unit of the computing device 40, such as a hard disk or a memory of the computing device 40. In other embodiments, the memory 401 may also be an external storage device of the computing device 40, such as a plug-in hard disk, a smart media card (SMC), and a Secure Digital (SD) card, a Flash Card and so on. Of course, the memory 401 may also include both the internal storage unit of the computing device 40 and its external storage device. In some embodiments, the memory 401 is generally used to store an operating system and various types of application software installed in the computing device 40, such as program codes of the device of switching resolution according to some embodiments described above. In addition, the memory 401 can also be used to temporarily store various types of data that have been output or will be output.

The processor 402 may be a Central Processing Unit (CPU), a controller, a microcontroller, a microprocessor, or other data processing chips in some embodiments. The processor 402 is generally used to control the overall operation of the computing device 40.

Specifically, in some embodiments, the processor 402 is configured to execute a program of a method of switching resolution stored in the processor 402, and when the program of the method of switching resolution is executed, the following steps are implemented:

in playing audio and/or video using DASH, acquiring a media presentation description (MPD) file and obtaining resolution information through parsing the MPD file;

during the playing of the audio and/or video, periodically determining a currently secure downloading speed according to a preset time interval and determining whether a resolution switching for the audio and/or video currently being played is required according to the secure downloading speed and the resolution information; and in accordance with a determination that the resolution switching is required, determining a switching time point according to an elapsed duration of a currently playing segment and a preset secure buffering duration and performing resolution switching at the switching time point.

Some specific embodiments and process of the foregoing method steps can refer to the corresponding embodiments described above, which are not repeatedly described herein.

According to some embodiments, a non-transitory computer-readable storage medium (volatile or nonvolatile) is provided. In some embodiments, the non-transitory computer-readable storage medium may include but not limited to at least one of: a flash memory, a hard disk, a multimedia card, a card-type memory (for example, SD or DX memory and so on), a random access memory (RAM), a static random access memory (SRAM), a read-only memory (ROM), an electrically erasable programmable read-only memory (EEPROM), a programmable read-only memory (PROM), a magnetic memory, magnetic disks, optical disks, servers, App Store and so on, which stores computer-readable instructions that upon execution by a processor cause the processor to implement the following steps:

in playing audio and/or video using DASH, acquiring a media presentation description (MPD) file and obtaining resolution information through parsing the MPD file;

during the playing of the audio and/or video, periodically determining a currently secure downloading speed according to a preset time interval and determining whether a resolution switching for the audio and/or video currently being played is required according to the secure downloading speed and the resolution information; and in accordance with a determination that the resolution switching is required, determining a switching time point according to an elapsed duration of a currently playing segment and a preset secure buffering duration and performing resolution switching at the switching time point.

Some specific embodiments and process of the foregoing method steps can refer to the corresponding embodiments described above, which are not repeatedly described herein.

The method and device of switching resolution, the computing device, and the computer-readable storage medium provided by the present application can periodically determine whether a resolution switching is required according to a currently secure downloading speed under a preset time interval, and automatically perform resolution switching at calculated switching time points; since the connection establishment time and the network jitter of obtaining segments are taken into account when calculating the secure downloading speed, current network speed can be guaranteed to meet a bandwidth requirement of the resolution after the resolution switching; in addition, performing resolution switching at the switching time points can avoid the situations where the segment corresponding to the resolution after the resolution switching has not been downloaded yet, but the segment corresponding to current resolution has been finished playing, thereby, seamless switching of audio and/or video is ensured, and a phenomenon of switching freeze will not occur.

It should be noted that, in this article, the terms "including", "comprising" or any other variants thereof are intended to cover non-exclusive inclusion, so that a process, method, article or device including a series of elements includes not only those elements, but also includes other elements not explicitly listed, or elements inherent to such a process, method, article, or device. Without more restrictions, an element limited by the sentence "including a . . . " does not exclude that there are other identical elements in the process, method, article, or device that includes the element.

The above-mentioned serial numbers of the embodiments of the present application are merely for description and do not represent the superiority or inferiority of the embodiments.

Through the description of the above embodiments, those skilled in the art can clearly understand that the methods in the above embodiments can be implemented by means of software plus a necessary universal hardware platform, and of course, also by hardware, but in many cases, the former is the better implementation.

The above are only some embodiments of the present application, and thus do not limit the patent scope of the present application, any equivalent structure or equivalent process transformation made by using the contents of the specification and drawings of the present application, or directly or indirectly used in other related technical fields are both included in the scope of patent protection of this application.

What is claimed is:

1. A method, comprising:
in playing audio and/or video using Dynamic Adaptive Streaming over HTTP (DASH), acquiring a Media Presentation Description (MPD) file and obtaining resolution information through parsing the MPD file;
during the playing of the audio and/or video, periodically determining a currently secure downloading speed according to a preset time interval and determining whether a resolution switching for the audio and/or video currently being played is required according to the secure downloading speed and the resolution information; and
in accordance with a determination that the resolution switching is required, determining a switching time point according to an elapsed duration of a currently playing segment and a preset secure buffering duration and performing resolution switching at the switching time point; and
wherein the periodically determining a currently secure downloading speed comprises:
obtaining playing information of N segments before the currently playing segment;
calculating an actual downloading speed of each segment based on the playing information of each segment, and calculating an average downloading speed according to actual downloading speeds of the N segments; and
multiplying the average downloading speed by a preset secure factor and a percentage to obtain the currently secure downloading speed, and
wherein the secure factor is 0.8, and
wherein the percentage K is calculated according to a formula of:

$$K=(D-L)/D;$$

wherein D is a playing duration of one segment; and

L is an average connection establishment duration calculated according to connection establishment durations of the N segments.

2. The method of claim 1, wherein the resolution information comprises: multiple usable resolutions and bandwidths corresponding to respective ones of the multiple resolutions.

3. The method of claim 1, wherein the playing information comprises:
a connection establishment duration, a downloading duration, and a total downloading byte count, and
wherein the calculating an actual downloading speed of each segment comprises:

the actual downloading speed=(8×the total downloading byte count)/(the connection establishment duration+the downloading duration).

4. The method of claim 2, wherein the determining whether a resolution switching for the audio and/or video currently being played is required comprises:
adjusting resolutions of subsequently playing segments to be less than a resolution corresponding to the bandwidth of the secure downloading speed.

5. The method of claim 1, wherein the determining a switching time point and the performing resolution switching at the switching time point comprises:
calculating the switching time point T according to a formula of:

$$T = \mathrm{ceil}\left(\frac{C+Q}{D}\right)$$

wherein ceil( ) is a round up function;
C is the elapsed duration of the currently playing segment; and
Q is the secure buffering duration, and Q is equal to 1.5 times the playing duration of one segment, and
wherein the resolution switching is performed when playing a T-th segment behind the currently playing segment.

6. The method of claim 1, further comprising:
determining whether the average connection establishment duration is larger than the playing duration of one segment;
in accordance with a determination that the average connection establishment duration is larger than the playing duration of one segment, adjusting the resolution of the audio and/or video to be played later to the minimum.

7. A computing device, comprising:
one or more processors; and
one or more non-transitory computer-readable storage mediums containing instructions configured to cause the one or more processors to perform operations comprising:
in playing audio and/or video using Dynamic Adaptive Streaming over HTTP (DASH), acquiring a Media Presentation Description (MPD) file and obtaining resolution information through parsing the MPD file;
during the playing of the audio and/or video, periodically determining a currently secure downloading speed according to a preset time interval and determining whether a resolution switching for the audio and/or video currently being played is required according to the secure downloading speed and the resolution information; and in accordance with a determination that the resolution switching is required, determining a switching time point according to an elapsed duration of a currently playing segment and a preset secure buffering duration and performing resolution switching at the switching time point, and
wherein the periodically determining a currently secure downloading speed comprises:
obtaining playing information of N segments before the currently playing segment;
calculating an actual downloading speed of each segment based on the playing information of each segment, and calculating an average downloading speed according to actual downloading speeds of the N segments; and
multiplying the average downloading speed by a preset secure factor and a percentage to obtain the currently secure downloading speed, and
wherein the secure factor is 0.8, and
wherein the percentage K is calculated according to a formula of:

$$K=(D-L)/D$$

wherein D is a playing duration of one segment; and
L is an average connection establishment duration calculated according to connection establishment durations of the N segments.

8. The computing device of claim 7, wherein the resolution information comprises: multiple usable resolutions and bandwidths corresponding to respective ones of the multiple resolutions.

9. The computing device of claim 7, wherein the playing information comprises:
a connection establishment duration, a downloading duration, and a total downloading byte count, and
wherein the calculating an actual downloading speed of each segment comprises:

the actual downloading speed=(8×the total downloading byte count)/(the connection establishment duration+the downloading duration).

10. The computing device of claim 8, wherein the determining whether a resolution switching for the audio and/or video currently being played is required comprises:
adjusting resolutions of subsequently playing segments to be less than a resolution corresponding to the bandwidth of the secure downloading speed.

11. The computing device of claim 7, wherein the determining a switching time point according to an elapsed duration of a currently playing segment and a preset secure buffering duration and performing resolution switching at the switching time point comprises:
calculating the switching time point T according to a formula of:

$$T = \mathrm{ceil}\left(\frac{C+Q}{D}\right)$$

wherein ceil( ) is a round up function;
C is the elapsed duration of the currently playing segment; and
Q is the secure buffering duration, and Q is equal to 1.5 times the playing duration of one segment, and
wherein the resolution switching is performed when playing a T-th segment behind the currently playing segment.

12. A non-transitory computer-program product tangibly embodied in a machine-readable non-transitory storage medium that comprises instructions configured to cause one or more processors to:
- in playing audio and/or video using Dynamic Adaptive Streaming over HTTP (DASH), acquire a Media Presentation Description (MPD) file and obtain resolution information through parsing the MPD file;
- during the playing of the audio and/or video, periodically determine a currently secure downloading speed according to a preset time interval and determine whether a resolution switching for the audio and/or video currently being played is required according to the secure downloading speed and the resolution information; and
- in accordance with a determination that the resolution switching is required, determine a switching time point according to an elapsed duration of a currently playing segment and a preset secure buffering duration and perform resolution switching at the switching time point, and
- wherein the periodically determining a currently secure downloading speed comprises:
- obtaining playing information of N segments before the currently playing segment;

calculating an actual downloading speed of each segment based on the playing information of each segment, and calculating an average downloading speed according to actual downloading speeds of the N segments; and
- multiplying the average downloading speed by a preset secure factor and a percentage to obtain the currently secure downloading speed, and wherein the secure factor is 0.8, and
wherein the percentage K is calculated according to a formula of:

$$K=(D-L)/D,$$

wherein D is a playing duration of one segment; and
L is an average connection establishment duration calculated according to connection establishment durations of the N segments.

13. The non-transitory computer-program product of claim 12, wherein the resolution information comprises: multiple usable resolutions and bandwidths corresponding to respective ones of the multiple resolutions.

14. The non-transitory computer-program product of claim 12, wherein the playing information comprises: a connection establishment duration, a downloading duration, and a total downloading byte count, and
wherein the calculating an actual downloading speed of each segment comprises:

the actual downloading speed=(8×the total downloading byte count)/(the connection establishment duration+the downloading duration).

15. The non-transitory computer-program product of claim 13, wherein the determining whether a resolution switching for the audio and/or video currently being played is required comprises:
adjusting resolutions of subsequently playing segments to be less than a resolution corresponding to the bandwidth of the secure downloading speed.

* * * * *